United States Patent
Chen et al.

(10) Patent No.: US 11,271,698 B2
(45) Date of Patent: Mar. 8, 2022

(54) METHOD AND DEVICE FOR SENDING REFERENCE SIGNAL, AND METHOD AND DEVICE FOR CONFIGURING REFERENCE SIGNAL

(71) Applicant: ZTE Corporation, Shenzhen (CN)

(72) Inventors: Yijian Chen, Shenzhen (CN); Zhaohua Lu, Shenzhen (CN); Yu Ngok Li, Shenzhen (CN); Hao Wu, Shenzhen (CN); Nan Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 15 days.

(21) Appl. No.: 16/764,084

(22) PCT Filed: Nov. 14, 2018

(86) PCT No.: PCT/CN2018/115447
§ 371 (c)(1),
(2) Date: May 14, 2020

(87) PCT Pub. No.: WO2019/096167
PCT Pub. Date: May 23, 2019

(65) Prior Publication Data
US 2020/0280410 A1      Sep. 3, 2020

(30) Foreign Application Priority Data

Nov. 14, 2017   (CN) ........................ 201711122765.2

(51) Int. Cl.
*H04W 72/04*      (2009.01)
*H04L 5/00*      (2006.01)

(52) U.S. Cl.
CPC .......... *H04L 5/0048* (2013.01); *H04L 5/0007* (2013.01); *H04L 5/0023* (2013.01); *H04W 72/042* (2013.01)

(58) Field of Classification Search
CPC ......... H04N 21/23439; H04N 21/8456; H04N 21/2402; H04N 21/2662; H04N 21/44209;
(Continued)

(56) References Cited

U.S. PATENT DOCUMENTS 7,505,087 B2 *   3/2009   Kang .................... H03J 1/0083
                                                              348/731
2006/0007895 A1 *   1/2006   Coralli ................ H04B 1/7107
                                                              370/335
(Continued)

FOREIGN PATENT DOCUMENTS

CN       101404794 A      4/2009
CN       104247320 A      12/2014
(Continued)

OTHER PUBLICATIONS

International Search Report for corresponding application PCT/CN2018/115447 filed Nov. 14, 2018; dated Jan. 30, 2019.
(Continued)

*Primary Examiner* — Eva Y Puente
(74) *Attorney, Agent, or Firm* — Cantor Colburn LLP

(57) ABSTRACT

Provided are a method and a device for sending a reference signal, and a method and device for configuring a reference signal. The method for sending the reference signal includes: determining that a conflict occurs between at least two reference signals, and selecting a processing manner for solving the conflict between the at least two reference signals from multiple conflict processing manners; and sending at least one reference signal in the at least two reference signals to a terminal according to the selected processing manner to instruct the terminal to measure the at least one reference signal.

20 Claims, 4 Drawing Sheets

Determine that a conflict occurs between at least two reference signals, and select a processing manner for solving the conflict between the at least two reference signals from multiple conflict processing manners — S202

Send at least one reference signal in the at least two reference signals to a terminal according to the selected processing manner to instruct the terminal to measure the at least one reference signal — S204

(58) Field of Classification Search
CPC ......... H04N 21/6125; H04N 21/23805; H04N 21/47202; H04N 21/6408; H04N 21/64769; H04L 5/0048; H04L 5/005; H04L 5/0007; H04L 27/2613; H04L 5/0073; H04L 5/0023; H04L 5/0051; H04L 5/0091; H04L 5/006; H04L 25/0226; H04L 27/262; H04L 5/0037; H04W 72/042; H04W 72/1226; H04W 88/02; H04W 72/082; H04W 88/08; H04W 72/0453; H04W 24/00; H04W 24/02; H04W 52/146; H04W 52/243; H04W 72/02; H04W 24/08; H04W 24/10
USPC .................................. 370/329, 335; 375/232
See application file for complete search history.

(56) References Cited

U.S. PATENT DOCUMENTS

2011/0013684 A1* 1/2011 Semenov .......... H04L 25/03006
375/232
2012/0069756 A1 3/2012 Ji
2013/0189976 A1 6/2013 Kim
2015/0003394 A1* 1/2015 Ono .................... H04W 52/242
370/329
2018/0206211 A1* 7/2018 Seo ......................... H04W 4/70
2018/0359740 A1* 12/2018 Sartori ............. H04W 72/0406
2020/0045619 A1* 2/2020 Alriksson ............. H04W 48/14

FOREIGN PATENT DOCUMENTS

| CN | 105744639 A | 7/2016 |
| CN | 106209331 A | 12/2016 |
| CN | 108111284 A | 6/2018 |

OTHER PUBLICATIONS

LG Electronics: "On Collision Avoidance for PTRS and Other RSs", 3GPP Draft, vol. RAN WG1, No. Qingdao, P.R China, Jun. 27, 2017-Jun. 30, 2017, Jun. 26, 2017, XP051299507.
European Search Report for corresponding application EP 18878058; dated Nov. 10, 2020.

* cited by examiner

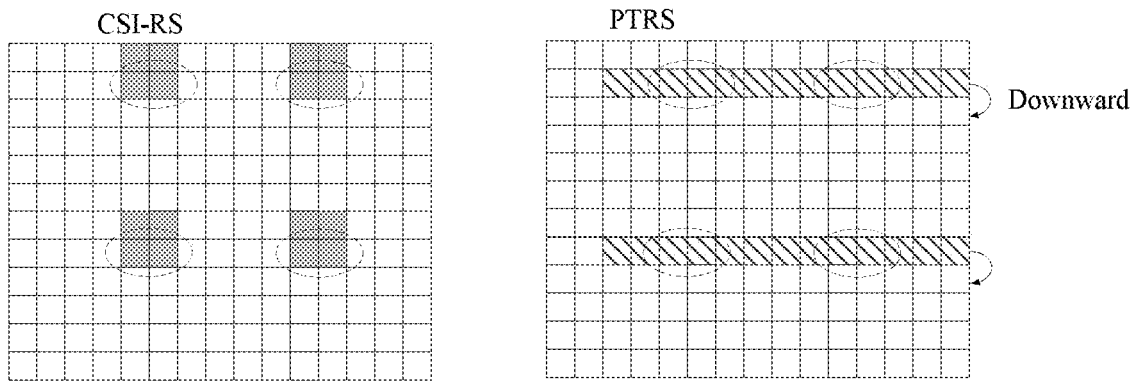
Fig. 5
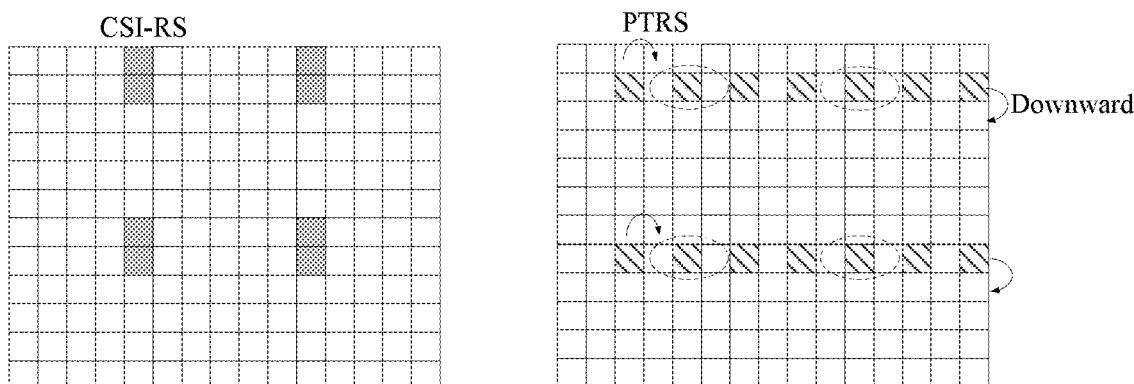
Fig. 6
| RS1 & RS2 | RS2 | RS2 | RS2 | RS2 | RS1 & RS2 | RS2 | RS2 | RS2 | RS2 |
Fig. 7

METHOD AND DEVICE FOR SENDING REFERENCE SIGNAL, AND METHOD AND DEVICE FOR CONFIGURING REFERENCE SIGNAL

CROSS-REFERENCE TO RELATED APPLICATION

The present application is based upon and claims priority to Chinese Patent Application No. 201711122765.2, filed on Nov. 14, 2017, the entire contents of which are incorporated herein by reference.

TECHNICAL FIELD

The present disclosure relates to the field of communications, and in particular to a method and a device for sending a reference signal, and a method and device for configuring a reference signal.

BACKGROUND

In the 5th-Generation (5G) New Radio (NR), there are a variety of reference signals that may often be referred to as pilots. These pilots have respective functions, and mainly include uplink pilots and downlink pilots.

The uplink pilots and the downlink pilots are all possible to have many configurations. The configurations of these reference signals have high requirements in flexibility, and cannot pre-define resources to make the reference signals orthogonal on sending resources, therefore there may be a conflict between the reference signals. However, methods for solving the conflict in related technologies are relatively single, and cannot solve the conflict problem flexibly, so that a terminal cannot correctly determine how a base station sends the pilots.

Concerning the above-mentioned technical problem, an effective solution hasn't been proposed in the relevant art.

SUMMARY

The embodiments of the present disclosure provide a method and a device for sending a reference signal, and a method and device for configuring a reference signal, which may at least solve a problem that a conflict cannot be solved flexibly in the relevant art.

According to an embodiment of the present disclosure, a method for sending a reference signal is provided, which includes that: it is determined that a conflict occurs between at least two reference signals, and a processing manner for solving the conflict between the at least two reference signals is selected from multiple conflict processing manners; and at least one reference signal in the at least two reference signals is sent to a terminal according to the selected processing manner to instruct the terminal to measure the at least one reference signal.

According to another embodiment of the present disclosure, a device for sending a reference signal is provided, which includes: a first selection module, configured to select, when determining that a conflict occurs between at least two reference signals, a processing manner for solving the conflict between the at least two reference signals from multiple conflict processing manners; and a sending module, configured to send at least one reference signal in the at least two reference signals to a terminal according to the selected processing manner to instruct the terminal to measure the at least one reference signal.

According to another embodiment of the present disclosure, a method for configuring a reference signal is further provided, which includes that: a time slot on which a conflict occurs when a first type of reference signal and a second type of reference signal are sent is determined; in a time slot on which no conflict occurs, a configuration parameter for configuring the second type of reference signal is selected from a first set, and the second type of reference signal is configured by using the selected configuration parameter; and in a time slot on which the conflict occurs, a configuration parameter for configuring the second type of reference signal is selected from a second set, and the second type of reference signal is configured by using the selected configuration parameter, wherein the second set is a subset of the first set.

According to another embodiment of the present disclosure, a device for configuring a reference signal is further provided, which includes: a second determination module, configured to determine a time slot on which a conflict occurs when a first type of reference signal and a second type of reference signal are sent; a second selection module, configured to, in a time slot on which no conflict occurs, select from a first set a configuration parameter for configuring the second type of reference signal, and configure the second type of reference signal by using the selected configuration parameter; and a third selection module, configured to, in a time slot on which the conflict occurs, select from a second set a configuration parameter for configuring the second type of reference signal, and configure the second type of reference signal by using the selected configuration parameter, wherein the second set is a subset of the first set.

According to still another embodiment of the present disclosure, a storage medium is further provided; the storage medium includes a stored program; and the program executes, when running, any of the above-mentioned methods.

According to still another embodiment of the present disclosure, a processor is further provided; the processor is configured to run a program; and the program executes, when running, any of the above-mentioned methods.

By means of the embodiments of the present disclosure, a base station selects, when determining that a conflict occurs between at least two reference signals, a processing manner for solving the conflict between the at least two reference signals from multiple conflict processing manners; and sends at least one reference signal in the at least two reference signals to a terminal according to the selected processing manner to instruct the terminal to measure the at least one reference signal. The processing manner may be selected from the multiple conflict processing manners, so the embodiments of the present disclosure can solve a problem that a conflict cannot be solved flexibly in the relevant art, achieve diversification on selection of the conflict processing manner, and improve the flexibility and the accuracy in selection.

BRIEF DESCRIPTION OF THE DRAWINGS

The accompanying drawings are described here to provide a further understanding of the present disclosure, and form a part of the present disclosure. The schematic embodiments and description of the present disclosure are adopted to explain the present disclosure, and do not form improper limits to the present disclosure. In the drawings:

FIG. 5 is a schematic diagram of shift of the position of a reference signal in a frequency domain according to an exemplary embodiment of the present disclosure.

FIG. 6 is a schematic diagram of shift of the position of a reference signal in a time domain according to an exemplary embodiment of the present disclosure.

FIG. 7 is a schematic diagram of dynamic selection of configuration parameters based on a time slots for a reference signal according to an exemplary embodiment of the present disclosure.

DETAILED DESCRIPTION OF THE EMBODIMENTS

The present disclosure is described below in detail with reference to the accompanying drawings and in combination with the embodiments. It is to be noted that the embodiments of the present disclosure and the characteristics of the embodiments may be combined with each other if there is no conflict.

It should be noted that, terminologies such as "first" and "second" in the specification, claims and accompanying drawings of the present disclosure are used to distinguish similar objects, and are unnecessary to describe a special order or a precedence order.

First Embodiment

Figure 1:
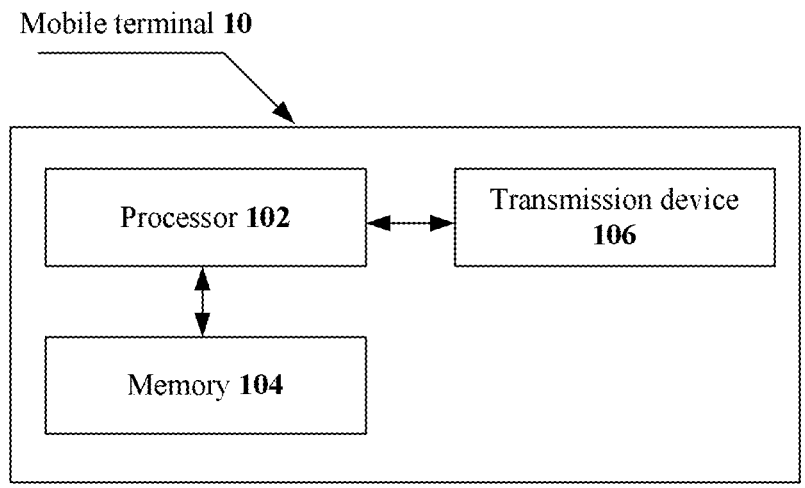
FIG. 1 is a block diagram of a hardware structure of a mobile terminal for implementing a method for sending a reference signal according to an embodiment of the present disclosure.

The method embodiment provided by a first embodiment of the present disclosure may be executed in a mobile terminal, a computer terminal or a similar operation device. For example, the method embodiment is executed on the mobile terminal, and FIG. 1 is a block diagram of a hardware structure of a mobile terminal for implementing a method for sending a reference signal according to an embodiment of the present disclosure. As shown in FIG. 1, the mobile terminal 10 may include one or more (only one is shown in FIG. 1) processors 102 (the processor 102 may include but not limited to a processing device such as a Microprogrammed Control Unit (MCU) or a Field Programmable Gate Array (FPGA)), a memory 104 configured to store data, and a transmission device 106 for a communication function. Those of ordinary skill in the art may understand that the structure shown in FIG. 1 is merely for illustration, rather than a limit to the above structure of the electronic device. For example, the mobile terminal 10 may further include more or less components shown in FIG. 1, or have a configuration different from FIG. 1.

The memory 104 may be configured to store a software program and a module of application software, such as a program instruction/module corresponding to the method for sending the reference signal in the embodiments of the present disclosure. The processor 102 executes, by running the software program and the module stored in the memory 104, various functional applications as well as data processing, that is, implementation of the above method. The memory 104 may include a high-speed Random Access Memory (RAM), and may further include a non-volatile memory such as one or more magnetic storage devices, a flash memory or other non-volatile solid-state memories. In some examples, the memory 104 may further include a memory remotely disposed relative to the processor 102; and these remote memories may be connected to the mobile terminal 10 via a network. An example of the network includes but not limited to an Internet, an intranet, a local area network, a mobile communication network, and a combination thereof.

The transmission device 106 is configured to receive or transmit data via one network. An example of the network may include a wireless network provided by a communication supplier of the mobile terminal 10. In an example, the transmission device 106 includes a Network Interface Controller (NIC) that may be connected to other network devices via a base station to communicate with the Internet. In an example, the transmission device 106 may be a Radio Frequency (RF) module that is configured to communicate with the Internet via a wireless manner.

Figure 2:
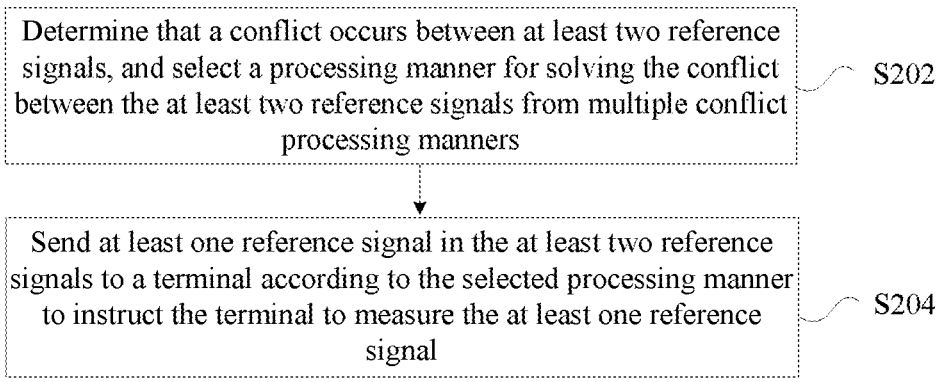
FIG. 2 is a flowchart of a method for sending a reference signal according to an embodiment of the present disclosure.

This embodiment provides a method for sending a reference signal. FIG. 2 is a flowchart of a method for sending a reference signal according to an embodiment of the present disclosure. As shown in FIG. 2, the flow includes the following operations.

In operation S202, it is determined that a conflict occurs between at least two reference signals, and a processing manner for solving the conflict between the at least two reference signals is selected from multiple conflict processing manners.

In operation S204, at least one reference signal in the at least two reference signals is sent to a terminal according to the selected processing manner to instruct the terminal to measure the at least one reference signal.

By means of the above operations, a base station selects, when determining that a conflict occurs between at least two reference signals, a processing manner for solving the conflict between the at least two reference signals from multiple conflict processing manners; and sends at least one reference signal in the at least two reference signals to a terminal according to the selected processing manner to instruct the terminal to measure the at least one reference signal. The processing manner may be selected from the multiple conflict processing manners, so the present disclosure solves a problem that a conflict cannot be solved flexibly in the relevant art, achieves diversification on selection of the conflict processing manner, and improves the flexibility and the accuracy in selection.

In some exemplary embodiments, an executer of the above operations may be but is not limited to be a base station.

In this embodiment, the conflict may occur between two reference signals, and may also occur among multiple reference signals. Different processing manners may be selected according to a severity degree of the conflict (a certain levels are provided), thus increasing the pertinence to solve the conflict.

In an exemplary embodiment, the multiple conflict processing manners are determined in at least one of the following manners: the multiple conflict processing manners are configured by the base station; and the multiple conflict processing manners are agreed between the base station and the terminal. In this embodiment, the base station may configure, according to attributes of the reference signal, conflict processing manners corresponding to different attributes, for example, a type, a density and a sending manner of the reference signal.

In an exemplary embodiment, the multiple conflict processing manners include at least two of the following processing manners: a part of reference signals in the at least two reference signals having the conflict are punctured; a parameter configuration of at least one reference signal in the at least two reference signals having the conflict is changed; and the conflict is processed in a precoding space division manner. In this embodiment, the part of reference signals that are punctured may be a part of information of one reference signal, may alternatively be a part of reference signals in a reference signal set, and may alternatively be a part of information in several reference signals of multiple reference signals.

In an exemplary embodiment, when the conflict processing manner is to change a sending parameter configuration of at least one reference signal in the at least two reference signals having the conflict, the parameter configuration includes at least one of the followings: a frequency domain sending position and/or a time domain sending position of the reference signal; a sending density of the reference signal; a sending power of the reference signal; a sending port of the reference signal; a sending sequence of the reference signal; and an orthogonal configuration of the reference signal. In this embodiment, the above multiple parameter configurations form a basis to select the conflict processing manner, and may alternatively serve as a basis for the base station to send the reference signal to the terminal.

In an exemplary embodiment, the operation that a processing manner for solving the conflict between the at least two reference signals is selected from multiple conflict processing manners includes at least one of the followings: a number of Resource Elements (REs) on which the conflict occurs between the at least two reference signals is determined, and a processing manner corresponding to the number of the REs is selected from the multiple conflict processing manners; a density of the at least two reference signals is determined, and a processing manner corresponding to the density of the at least two reference signals is selected from the multiple conflict processing manners; and sending or receiving beams of the at least two reference signals are determined, and a processing manner corresponding to the sending or receiving beams of the at least two reference signals is selected from the multiple conflict processing manners. In this embodiment, the multiple conflict processing manners may be selected according to different parameter information, so that the flexibility in selection is increased.

In an exemplary embodiment, the operation that a processing manner corresponding to the number of the REs is selected from the multiple conflict processing manners includes at least one of the followings: when the number of the REs is greater than a preset number, frequency domain positions and/or time domain positions of the at least two reference signals having the conflict are shifted; and when the number of the REs is smaller than or equal to the preset number, a part of reference signals in the at least two reference signals having the conflict are punctured.

In an exemplary embodiment, the operation that a processing manner corresponding to the density of the at least two reference signals is selected from the multiple conflict processing manners includes: a part of reference signals in the at least two reference signals having the conflict are punctured according to a ratio of the density of the at least two reference signals having the conflict to a preset density.

In an exemplary embodiment, the operation that a processing manner corresponding to the sending or receiving beams of the at least two reference signals is selected from the multiple conflict processing manners includes one of the followings: in a case where the sending or receiving beams of the at least two reference signals are orthogonal, the conflict between the reference signals is processed in a precoding space division manner; and in a case where the sending or receiving beams of the at least two reference signals are not orthogonal, a part of reference signals in the at least two reference signals having the conflict are punctured, or a parameter configuration of at least one reference signal in the at least two reference signals having the conflict is changed.

In this embodiment, the above actions of shifting or not shifting, puncturing or not puncturing may be understood as being respectively corresponding to one reference signal configuration parameter. In this sense, the solution is equivalent to configuring multiple reference signal parameters in advance, and making a selection according to determination information.

Figure 3:
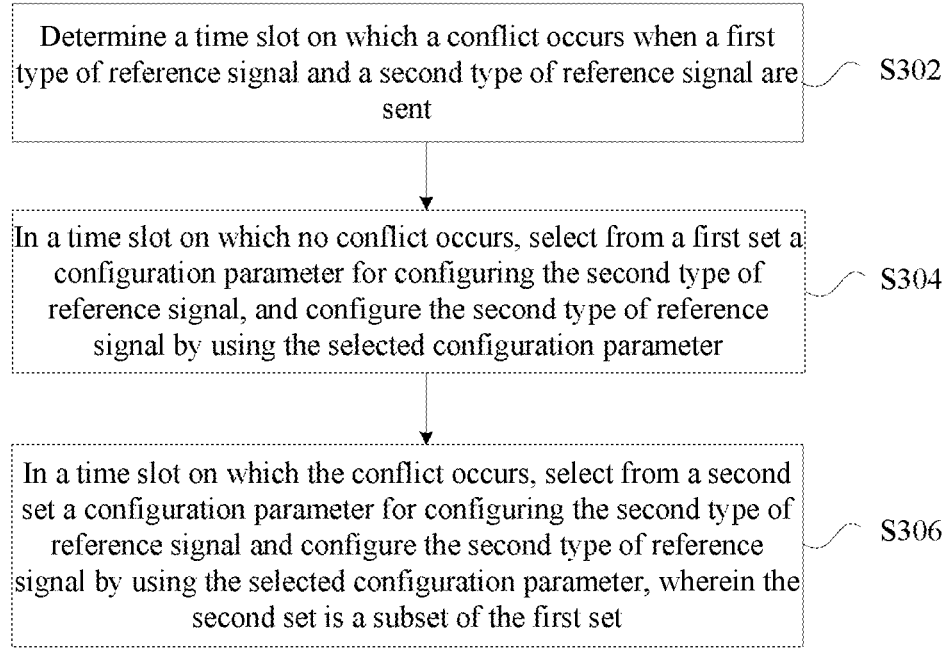
FIG. 3 is a flowchart of a method for configuring a reference signal according to an embodiment of the present disclosure.

This embodiment provides a method for configuring a reference signal. FIG. 3 is a flowchart of a method for configuring a reference signal according to an embodiment of the present disclosure. As shown in FIG. 3, the process includes the following operations.

In operation S302, a time slot on which a conflict occurs when a first type of reference signal and a second type of reference signal are sent is determined.

In operation S304, in a time slot on which no conflict occurs, a configuration parameter for configuring the second type of reference signal is selected from a first set, and the second type of reference signal is configured by using the selected configuration parameter.

In operation S306, in a time slot on which the conflict occurs, a configuration parameter for configuring the second type of reference signal is selected from a second set, and the second type of reference signal is configured by using the selected configuration parameter, wherein the second set is a subset of the first set.

By means of the above operations, a base station determines a time slot on which a conflict occurs when a first type of reference signal and a second type of reference signal are sent; in a time slot on which no conflict occurs, the base station selects from a first set a configuration parameter for configuring the second type of reference signal, and configures the second type of reference signal by using the selected configuration parameter; and in a time slot on which the conflict occurs, the base station selects from a second set a configuration parameter for configuring the second type of reference signal, and configures the second type of reference signal by using the selected configuration parameter, wherein the second set is a subset of the first set. That is, the conflict may be prevented in advance, so that a problem that the conflict cannot be effectively controlled in the relevant art is solved, and the occurrence of the conflict may be prevented in advance.

In some exemplary embodiments, an executer of the above operations may be but is not limited to be a base station.

In an exemplary embodiment, the first type of reference signal is a reference signal configured via high-layer signaling, and the second type of reference signal is a reference signal configured via physical-layer signaling.

The present disclosure is described below in detail in combination with the embodiments.

First Embodiment

In the 5G NR, there are a variety of reference signals that may often be referred to as pilots. These pilots have respective functions, and mainly include downlink pilots and uplink pilots.

The downlink pilots include a Downlink Demodulation Reference Signal (DL DMRS), a Channel State Information Reference Signal (CSI-RS), a Downlink Phase-Tracking Reference Signal (DL PTRS), and a Tracking Reference Signal (TRS). The DL DMRS mainly functions to demodulate downlink data. The DL PTRS is mainly configured for downlink estimation of phase noise to improve the performance. There are many types of CSI-RSs: a CSI-RS for beam management; and a CSI-RS for CSI measurement of a downlink channel. The TRS is mainly configured to track a time frequency deviation.

The uplink pilots include an UL DMRS, a Sounding Reference Signal (SRS), and an UL PTRS. The UL DMRS mainly functions to demodulate downlink data. The SRS is configured to measure uplink CSI. The UL PTRS is mainly configured for uplink estimation of phase noise to improve the performance.

These pilots are all possible to have multiple configurations, including a density, a position, a power, a period, a multiplexing manner, an orthogonal code, the number of ports, a quasi-co-location relationship, etc.

A main problem in related technologies lies in that the configurations of these reference signals have high requirements in flexibility, and cannot pre-define resources to make the reference signals orthogonal on sending resources, therefore there may often be a conflict between the reference signals, and thus, a terminal cannot correctly determine how a base station sends the pilots.

In view of the technical problem in the relevant art, this embodiment provides the following solution, which mainly includes the following operations.

In operation 1, a sending end (corresponding to the above base station) configures multiple processing manners or sending and receiving ends have agreements on the multiple processing manners.

In operation 2 (corresponding to the above S202), the sending end selects a processing manner according to determination information.

In operation 3 (corresponding to the above S206), the sending end sends a reference signal according to the selected processing manner.

Figure 4:
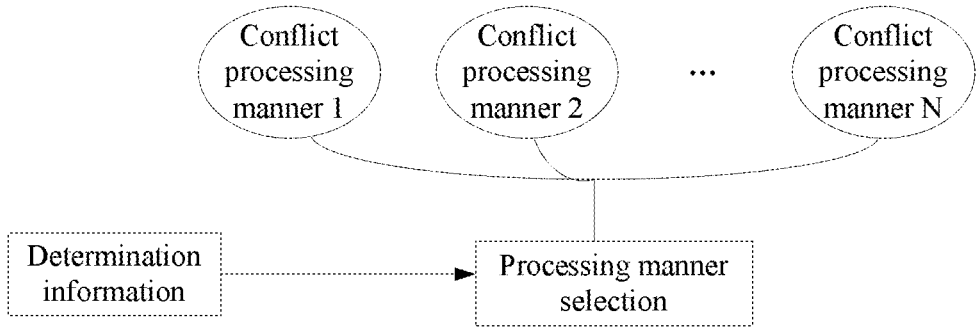
FIG. 4 is a schematic diagram for selecting a conflict manner according to an embodiment of the present disclosure.

(The receiving end determines to perform reference signal measurement according to the selected processing manner), as shown in FIG. 4.

The above multiple processing manners include at least one of the followings.

Processing manner A: a part of reference signals are punctured.

Processing manner B: a sending parameter configuration of one or more reference signals is changed.

More specifically, the processing manner B includes: a processing manner B1 in which a frequency domain sending position or a time domain sending position of one or more reference signals is changed; a processing manner B2 in which a sending density of one or more reference signals is changed; a processing manner B3 in which a sending power of one or more reference signals is changed; a processing manner B4 in which a sending port of one or more reference signals is changed; a processing manner B5 in which a sending sequence of one or more reference signals is changed; and a processing manner B6 in which an orthogonal code configuration of one or more reference signals is changed.

Processing manner C: precoding space division is used.

The number of collided REs is used to determine which manner is used.

Case 1: a large number of collided REs: the PTRS is shifted, which is referred to the embodiment.

Case 2: a small number of collided REs: the PTRS is not sent (i.e., is punctured) on the REs having the conflict.

The embodiment on shift of the PTRS is as shown in FIG. 5.

In FIG. 5, the CSI-RS and the PTRS have a conflict. In such a situation, a frequency domain position of the PTRS may be shifted, e.g., to the next subcarrier, so as to prevent the conflict. In addition to the shift in the frequency domain, the time domain position may also be shifted in some cases, for example, as shown in FIG. 6.

How to shift may be determined according to the number of collided REs.

The density of the reference signal is used to determine which manner is used.

For example, if the CSI-RS has a density greater than 1RE/Port/RB, the CSI-RS is punctured; if the CSI-RS has a density smaller than or equal to 1RE/Port/RB, the PTRS is punctured. Alternatively, if the PTRS has a frequency domain density greater than 1SC/Port/RB, the PTRS is punctured.

If the PTRS has a frequency domain density equal to 1SC/Port/RB, the PTRS is shifted.

The receiving/sending beams of the reference signals may be used to determine which manner is used.

For example, if the beams are orthogonal, precoding space division may be used.

If the beams are not orthogonal, a part of pilots may be punctured, or a shift manner is used.

It is to be noted that the above action of shifting or not shifting, puncturing or not puncturing may be understood as being respectively corresponding to one reference signal configuration parameter. In this sense, the solution is equivalent to configuring multiple reference signal parameters in advance, and making a selection according to determination information.

Second Embodiment

A first type of reference signal and a second type of reference signal may be collided in a part of time slots, and not collided in another part of time slots. For a case where the first type of reference signal is configured via high-layer signaling, and the second type of reference signal is configured via physical-layer signaling, the high-layer signaling may generally provide configuration and update at a long interval, and the physical-layer signaling may realize selection of a dynamic configuration parameter every time slot, as shown in FIG. 7.

For a time slot on which no conflict occurs, the configuration of the second type of reference signal may be selected from a set X. For a time slot on which the conflict occurs, the configuration of the second type of reference signal may be selected from a set Y, wherein the set Y is a subset of the set X. As a matter of fact, the subset reflects a limit to the configuration of the second type of reference signal.

Hereinafter, a downlink pilot is used as an example for description.

Conflict Between DL DMRS and DL PTRS:

A density parameter of the DMRS is configured via the physical-layer signaling, and a parameter of the PTRS is configured via the high-layer signaling. The set X has two density parameters, whereas the set Y only has one density parameter.

A type parameter of the DMRS is configured via the physical-layer signaling, and a parameter of the PTRS is configured via the high-layer signaling. The set X has two type parameters, whereas the set Y only has one type parameter.

An orthogonal code parameter of the DMRS is configured via the physical-layer signaling, and a parameter of the PTRS is configured via the high-layer signaling. The set X has two orthogonal code parameters, whereas the set Y only has one orthogonal code parameter.

A position parameter of the DMRS is configured via the physical-layer signaling, and a parameter of the PTRS is configured via the high-layer signaling. The set X has two position parameters, whereas the set Y only has one position parameter.

A port number parameter of the DMRS is configured via the physical-layer signaling, and a parameter of the PTRS is configured via the high-layer signaling. The set X has two port number parameters, whereas the set Y only has one port number parameter.

Conflict Between DL DMRS and DL CSI-RS:

A density parameter of the DMRS is configured via the physical-layer signaling, and a parameter of the CSI-RS is configured via the high-layer signaling. The set X has two density parameters, whereas the set Y only has one density parameter.

A type parameter of the DMRS is configured via the physical-layer signaling, and a parameter of the CSI-RS is configured via the high-layer signaling. The set X has two type parameters, whereas the set Y only has one type parameter.

An orthogonal code parameter of the DMRS is configured via the physical-layer signaling, and a parameter of the CSI-RS is configured via the high-layer signaling. The set X has two orthogonal code parameters, whereas the set Y only has one orthogonal code parameter.

A position parameter of the DMRS is configured via the physical-layer signaling, and a parameter of the CSI-RS is configured via the high-layer signaling. The set X has two position parameters, whereas the set Y only has one position parameter.

A port number parameter of the DMRS is configured via the physical-layer signaling, and a parameter of the CSI-RS is configured via the high-layer signaling. The set X has two port number parameters, whereas the set Y only has one port number parameter.

For the conflict between the UL DMRS and the SRS, the processing method is similar to that of the conflict between the DL DMRS and the CSI-RS.

Conflict Between TRS and DL DMRS:

A density parameter of the DMRS is configured via the physical-layer signaling, and a parameter of the TRS is configured via the high-layer signaling. The set X has two density parameters, whereas the set Y only has one density parameter.

A type parameter of the DMRS is configured via the physical-layer signaling, and a parameter of the TRS is configured via the high-layer signaling. The set X has two type parameters, whereas the set Y only has one type parameter.

An orthogonal code parameter of the DMRS is configured via the physical-layer signaling, and a parameter of the TRS is configured via the high-layer signaling. The set X has two orthogonal code parameters, whereas the set Y only has one orthogonal code parameter.

A position parameter of the DMRS is configured via the physical-layer signaling, and a parameter of the TRS is configured via the high-layer signaling. The set X has two position parameters, whereas the set Y only has one position parameter.

A port number parameter of the DMRS is configured via the physical-layer signaling, and a parameter of the TRS is configured via the high-layer signaling. The set X has two port number parameters, whereas the set Y only has one port number parameter.

In the above embodiment, the configuration of a reference signal A changes in terms of an agreed rule and according to a configuration of a reference signal B that has the conflict at present. A solution of the reference signal is determined according to a severity degree of the conflict (the number/proportion of conflict REs). A reference signal parameter configuration of a physical layer is limited in the time slot on which the conflict occurs. Thus, in case of the conflict of the reference signal, the impact on system performance is effectively reduced.

By means of the above-mentioned descriptions on the implementation manner, the person skilled in the art may clearly understand that the present disclosure may be implemented by software plus a necessary universal hardware platform, and may alternatively be implemented by hardware, but under most conditions, the former is a better implementation manner. Based on such an understanding, the technical solutions of the present disclosure essentially, or the part contributing to related technologies may be implemented in a form of a software product. The computer software product is stored in a storage medium (such as a Read Only Memory (ROM)/Random Access Memory (RAM), a magnetic disk, and an optical disc) and includes a plurality of instructions for instructing a terminal device (which may be a mobile phone, a computer, a server, or a network device) to execute the methods described in the embodiments of the present disclosure.

Second Embodiment

This embodiment further provides a method for sending a reference signal. The device is configured to implement the above-mentioned embodiments and preferred implementation manners. A content that has been described will no longer be repeated. As used below, the term "module" may implement a combination of software and/or hardware having a predetermined function. Although the device described in the following embodiments is implemented by software preferably, the implementation of hardware or a combination of the software and the hardware may also be conceivable.

Figure 8:
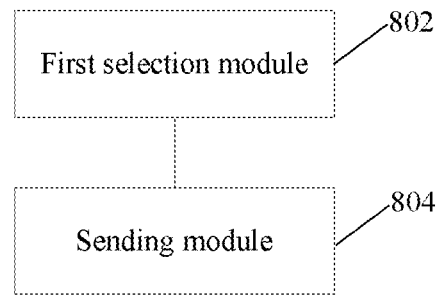
FIG. 8 is a structural block diagram of a device for sending a reference signal according to an embodiment of the present disclosure.

FIG. 8 is a structural block diagram of a device for sending a reference signal according to an embodiment of the present disclosure. As shown in FIG. 8, the device includes: a first selection module 802 and a sending module 804. The device is described below.

The first selection module 802 is configured to select, when determining that a conflict occurs between at least two reference signals, a processing manner for solving the conflict between the at least two reference signals from multiple conflict processing manners; and the sending module 804 is connected to the first selection module 802, and configured to send at least one reference signal in the at least two reference signals to a terminal according to the selected processing manner to instruct the terminal to measure the at least one reference signal.

In an exemplary embodiment, the multiple conflict processing manners include at least two of the following processing manners: a part of reference signals in the at least two reference signals having the conflict are punctured; a parameter configuration of at least one reference signal in the at least two reference signals having the conflict is changed; and the conflict is processed in a precoding space division manner.

In an exemplary embodiment, when the conflict processing manner is to change a sending parameter configuration of at least one reference signal in the at least two reference signals having the conflict, the parameter configuration includes at least one of the followings: a frequency domain sending position and/or a time domain sending position of the reference signal; a sending density of the reference signal; a sending power of the reference signal; a sending port of the reference signal; a sending sequence of the reference signal; and an orthogonal configuration of the reference signal.

In an exemplary embodiment, the first selection module 802 selects a processing manner for solving the conflict between the at least two reference signals from the multiple conflict processing manners via one of the following manners: determining a number of REs on which the conflict occurs between the at least two reference signals, and selecting a processing manner corresponding to the number of the REs from the multiple conflict processing manners; determining a density of the at least two reference signals, and selecting a processing manner corresponding to the density of the at least two reference signals is selected from the multiple conflict processing manners; and determining sending or receiving beams of the at least two reference signals, and selecting a processing manner corresponding to the sending or receiving beams of the at least two reference signals is selected from the multiple conflict processing manners.

In an exemplary embodiment, the selection module 802 selects a processing manner corresponding to the number of the REs from the multiple conflict processing manners via one of the following manners: when the number of the REs is greater than a preset number, frequency domain positions and/or time domain positions of the at least two reference signals having the conflict are shifted; and when the number of the REs is smaller than or equal to the preset number, a part of reference signals in the at least two reference signals having the conflict are punctured.

In an exemplary embodiment, the first selection module 802 selects a processing manner corresponding to the density of the at least two reference signals from the multiple conflict processing manners via one of the following manners includes: a part of reference signals in the at least two reference signals having the conflict are punctured according to a ratio of the density of the at least two reference signals having the conflict to a preset density.

In an exemplary embodiment, the operation that the first selection module 802 selects a processing manner corresponding to the sending or receiving beams of the at least two reference signals from the multiple conflict processing manners via one of the following manners: in a case where the sending or receiving beams of the at least two reference signals are orthogonal, the conflict between the reference signals is processed in a precoding space division manner; and in a case where the sending or receiving beams of the at least two reference signals are not orthogonal, a part of reference signals in the at least two reference signals having the conflict are punctured, or a parameter configuration of at least one reference signal in the at least two reference signals having the conflict is changed.

Figure 9:
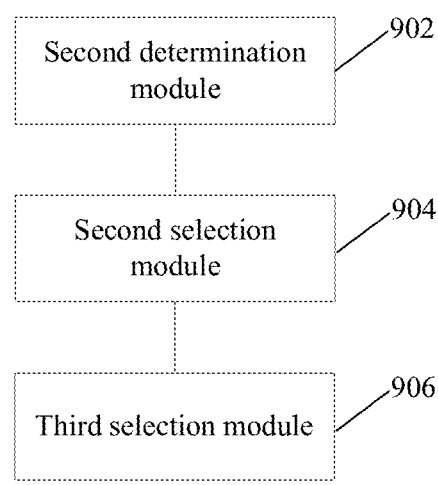
FIG. 9 is a structural block diagram of a device for configuring a reference signal according to an embodiment of the present disclosure.

FIG. 9 is a structural block diagram of a device for configuring a reference signal according to an embodiment of the present disclosure. As shown in FIG. 9, the device includes: a second determination module 902, a second selection module 904 and a third selection module 906. The device is described below:

The second determination module 902 is configured to determine a time slot on which a conflict occurs when a first type of reference signal and a second type of reference signal are sent; the second selection module 904 is connected to the second determination module 902 and configured to, in a time slot on which no conflict occurs, select from a first set a configuration parameter for configuring the second type of reference signal, and configure the second type of reference signal by using the selected configuration parameter; and the third selection module 906 is connected to the second selection module 904 and configured to, in a time slot on which the conflict occurs, select from a second set a configuration parameter for configuring the second type of reference signal, and configure the second type of reference signal by using the selected configuration parameter, wherein the second set is a subset of the first set.

In an exemplary embodiment, the first type of reference signal is a reference signal configured via high-layer signaling, and the second type of reference signal is a reference signal configured via physical-layer signaling.

It is to be noted that each module may be implemented by software or hardware. The later may be implemented via the following manner but is not limited thereto: the above modules are located in the same processor; or the above modules are respectively located in different processors in any combined form.

An embodiment of the present disclosure further provides a storage medium; the storage medium includes a stored program; and the program executes, when running, any of the above-mentioned methods.

In some exemplary embodiments, the storage medium may be configured to store a program code for executing the above operations.

In some exemplary embodiments, the storage medium may include but not limited to: various media capable of storing a program code such as a U disk, an ROM, an RAM, a mobile hard disk, a magnetic disk or an optical disc.

An embodiment of the present disclosure further provides a processor; the processor is configured to run a program; and the program executes, when running, any of the above-mentioned methods.

Optionally, an example in this embodiment may be referred to the examples described in the above embodiments and optional implementation manners, and will no longer be repeated herein.

It is apparent that those skilled in the art should understand that the modules or operations of the present disclosure may be implemented by a general-purpose computing device and centralized in a single computing device or distributed over a network consisting of a plurality of computing devices. In some exemplary embodiments, they may be implemented by a program code executable by a computing device, so that they may be stored in a storage device and executed by the computing device. Moreover, they may be different from the operations illustrated or described herein in some cases, or implemented by respectively fabricating them into respective integrated circuit modules or by fabricating a plurality of modules or operations of them into a single integrated circuit module. By doing so, the present disclosure is not limited to any specific combination of hardware and software.

The above are only preferred embodiments of the present disclosure and should not be used for limiting the present disclosure. For those skilled in the art, the present disclosure may have various modifications and changes. Any modifications, equivalent replacements, improvements and the like within the spirit and principle of the present disclosure should be included in the scope of protection of the present disclosure.

What is claimed is:

1. A method for sending a reference signal, comprising:
   determining that a conflict occurs between at least two reference signals, and selecting a processing manner for solving the conflict between the at least two reference signals from multiple conflict processing manners; and
   sending at least one reference signal in the at least two reference signals to a terminal according to the selected processing manner to instruct the terminal to measure the at least one reference signal.

2. The method as claimed in claim 1, wherein the multiple conflict processing manners comprises at least two of the following processing manners:
   puncturing a part of reference signals in the at least two reference signals having the conflict;
   changing a parameter configuration of at least one reference signal in the at least two reference signals having the conflict; and
   processing the conflict in a preceding space division manner.

3. The method as claimed in claim 2, wherein the parameter configuration comprises at least one of the followings:
   a frequency domain sending position and/or a time domain sending position of the reference signal;
   a sending density of the reference signal;
   a sending power of the reference signal;
   a sending port of the reference signal;
   a sending sequence of the reference signal; and
   an orthogonal configuration of the reference signal.

4. The method as claimed in claim 1, wherein the selecting a processing manner for solving the conflict between the at least two reference signals from multiple conflict processing manners comprises one of the followings:
   determining a number of Resource Elements (REs) on which the conflict occurs between the at least two reference signals, and selecting a processing manner corresponding to the number of the REs from the multiple conflict processing manners;
   determining a density of the at least two reference signals, and selecting a processing manner corresponding to the density of the at least two reference signals from the multiple conflict processing manners; and
   determining sending or receiving beams of the at least two reference signals, and selecting a processing manner corresponding to the sending or receiving beams of the at least two reference signals from the multiple conflict processing manners.

5. The method as claimed in claim 4, wherein the selecting a processing manner corresponding to the number of the REs from the multiple conflict processing manners comprises one of the followings:
   when the number of the REs is greater than a preset number, shifting frequency domain positions and/or time domain positions of the at least two reference signals having the conflict; and
   when the number of the REs is smaller than or equal to the preset number, puncturing a part of reference signals in the at least two reference signals having the conflict.

6. The method as claimed in claim 4, wherein the selecting a processing manner corresponding to the density of the at least two reference signals from the multiple conflict processing manners comprises:
   puncturing, according to a ratio of the density of the at least two reference signals having the conflict to a preset density, a part of reference signals in the at least two reference signals having the conflict.

7. The method as claimed in claim 4, wherein the selecting a processing manner corresponding to the sending or receiving beams of the at least two reference signals from the multiple conflict processing manners comprises one of the followings:
   in a case where the sending or receiving beams of the at least two reference signals are orthogonal, processing the conflict between the reference signals in a precoding space division manner; and
   in a case where the sending or receiving beams of the at least two reference signals are not orthogonal, puncturing a part of reference signals in the at least two reference signals having the conflict, or changing a parameter configuration of at least one reference signal in the at least two reference signals having the conflict.

8. A device for sending a reference signal, comprising:
   a first selection module, configured to determine that a conflict occurs between at least two reference signals, and select a processing manner for solving the conflict between the at least two reference signals from multiple conflict processing manners; and
   a sending module, configured to send at least one reference signal in the at least two reference signals to a terminal according to the selected processing manner to instruct the terminal to measure the at least one reference signal.

9. The device as claimed in claim 8, wherein the multiple conflict processing manners comprises at least two of the following processing manners:
   puncturing a part of reference signals in the at least two reference signals having the conflict;
   changing a parameter configuration of at least one reference signal in the at least two reference signals having the conflict; and
   processing the conflict in a precoding space division manner.

10. A method for configuring a reference signal, comprising:
    determining a time slot on which a conflict occurs when a first type of reference signal and a second type of reference signal are sent;
    in a time slot on which no conflict occurs, selecting from a first set a configuration parameter for configuring the second type of reference signal, and configuring the second type of reference signal by using the selected configuration parameter; and
    in a time slot on which the conflict occurs, selecting from a second set a configuration parameter for configuring the second type of reference signal, and configuring the second type of reference signal by using the selected configuration parameter, wherein the second set is a subset of the first set.

11. The method as claimed in claim 10, wherein
the first type of reference signal is a reference signal configured via high-layer signaling, and
the second type of reference signal is a reference signal configured via physical-layer signaling.

12. A device for configuring a reference signal, comprising:
a second determination module, configured to determine a time slot on which a conflict occurs when a first type of reference signal and a second type of reference signal are sent;
a second selection module, configured to, in a time slot on which no conflict occurs, select from a first set a configuration parameter for configuring the second type of reference signal, and configure the second type of reference signal by using the selected configuration parameter; and
a third selection module, configured to, in a time slot on which the conflict occurs, select from a second set a configuration parameter for configuring the second type of reference signal, and configure the second type of reference signal by using the selected configuration parameter,
wherein the second set is a subset of the first set.

13. A non-transitory storage medium, comprising a stored program, wherein the program executes, when running, the method as claimed in claim 1.

14. A processor, configured to run a program, wherein the program executes, when running, the method as claimed in claim 1.

15. The device as claimed in claim 8, wherein the parameter configuration comprises at least one of the followings:
a frequency domain sending position and/or a time domain sending position of the reference signal;
a sending density of the reference signal;
a sending power of the reference signal;
a sending port of the reference signal;
a sending sequence of the reference signal; and
an orthogonal configuration of the reference signal.

16. The device as claimed in claim 8, wherein the first selection module is configured to select a processing manner for solving the conflict between the at least two reference signals from multiple conflict processing manners based on one of the following manners:
determine a number of Resource Elements (REs) on which the conflict occurs between the at least two reference signals, and select a processing manner corresponding to the number of the REs from the multiple conflict processing manners;
determine a density of the at least two reference signals, and select a processing manner corresponding to the density of the at least two reference signals from the multiple conflict processing manners; and
determine sending or receiving beams of the at least two reference signals, and select a processing manner corresponding to the sending or receiving beams of the at least two reference signals from the multiple conflict processing manners.

17. The method as claimed in claim 10, wherein the parameter configuration comprises at least one of the followings:
a density parameter;
a type parameter;
an orthogonal code parameter;
a position parameter; and
a port number parameter.

18. The device as claimed in claim 12, wherein
the first type of reference signal is a reference signal configured via high-layer signaling, and
the second type of reference signal is a reference signal configured via physical-layer signaling.

19. A non-transitory storage medium, comprising a stored program, wherein the program executes, when running, the method as claimed in claim 10.

20. A processor, configured to run a program, wherein the program executes, when running, the method as claimed in claim 10.

* * * * *